United States Patent [19]

Storace et al.

[11] 3,936,114

[45] Feb. 3, 1976

[54] POSTAGE METER MOUNTING FIXTURE

[75] Inventors: Anthony Storace, Tarrytown, N.Y.; James Morabito, Bethel, Conn.

[73] Assignee: Pitney-Bowes, Inc., Stamford, Conn.

[22] Filed: Mar. 12, 1975

[21] Appl. No.: 557,489

[52] U.S. Cl. .................................. 312/311; 312/294

[51] Int. Cl.² .......................................... G01G 13/02

[58] Field of Search ........... 312/276, 294, 304, 311; 177/1, 3, 4, 25

[56] References Cited

UNITED STATES PATENTS

| | | | |
|---|---|---|---|
| 2,629,644 | 2/1953 | Heys | 312/311 |
| 3,072,452 | 1/1963 | Sleeper | 312/311 |
| 3,682,263 | 8/1972 | Bonneric | 177/1 |

*Primary Examiner*—Casmir A. Nunberg
*Attorney, Agent, or Firm*—William D. Soltow, Jr.; Albert W. Scribner; Robert S. Salzman

[57] ABSTRACT

A mounting fixture for mounting a postage meter to a mail-handling machine is disclosed. The fixture features a pivotable housing which pivots to disengage the postage meter from its printing position. A pair of elongated tracks are disposed upon the housing, which then guides and allows the postage meter to be pulled forward to an accessible position. In this position, the meter is easily set to a new register reading for purposes of adding funds to the machine.

5 Claims, 4 Drawing Figures

POSTAGE METER MOUNTING FIXTURE

This invention pertains to fixturing devices, and more particularly to a mounting fixture for mounting a postage meter to a mail-handling machine.

BACKGROUND OF THE INVENTION

In high speed mail-handling machines of the type generally shown in application Ser. No. 476,618, now U.S. Pat. No. 3,877,531 mail is transported through the system with a vertical orientation. The reason for moving pieces of mail about their edge, is that there is less drag upon the letters, and the weighing is more efficaciously accomplished.

With the vertical orientation of the letters, there is necessarily needed a means to mount a postage meter to the mailing machine with a corresponding vertical orientation. This requirement poses certain difficulties, one of which is obtaining access to the meter for recharging (funding) purposes.

As a result of the vertical orientation of the meter, it is mounted on the mailing machine in a poorly accessible position for reading, servicing or funding the meter. The present invention is for a means of obtaining easy access to the meter which is normally in an inaccessible position.

SUMMARY OF THE INVENTION

This invention relates to a fixture for mounting a postage meter to a mail-handling machine. A housing is provided for supporting the postage meter with a vertical orientation to accommodate the vertically oriented pieces of mail. In this position, the meter is operative to print postage. The housing is shaped like a cradle, supporting the meter between two adjacent side members which are structurally joined by an undercarriage and post members.

The housing is pivotable to disengage the meter from the mailing machine. Two elongated slots are provided along the length of the cradle for slidably moving the postage meter to the forward part of the mail-handling machine. When the meter is moved forward, the meter can be manually set to a new register reading for purposes of adding funds.

It is an object of this invention to provide an improved fixture for mounting a postage meter to a mail-handling machine;

It is another object of the invention to provide a cradle-like support for mounting a postage meter with a vertical orientation so as to accommodate vertically transported pieces of mail;

It is still another object of this invention to provide a postage meter support for allowing ease of access to the postage meter.

These and other objects of the invention will be better understood and will become more apparent with reference to the following detailed description taken in conjunction with the accompanying drawings, in which.

DETAILED DESCRIPTION

Generally speaking, the invention is for a postage meter mounting fixture for mounting a postage meter to a mail-handling machine. A housing supports the meter in a first postage printing position such that envelopes with a vertical orientation will be marked with postage. The meter is also vertically oriented in this position. The housing has means to pivot itself with respect to the mail-handling machine. The postage meter will assume a second disengaged position, when the housing is pivoted. The housing has at least one elongated track extending along its length portion. The postage meter slidably moves along this track when the meter is in the disengaged position. The postage meter will move along this track from a first generally inaccessible position to a second accessible position.

Figure 1:
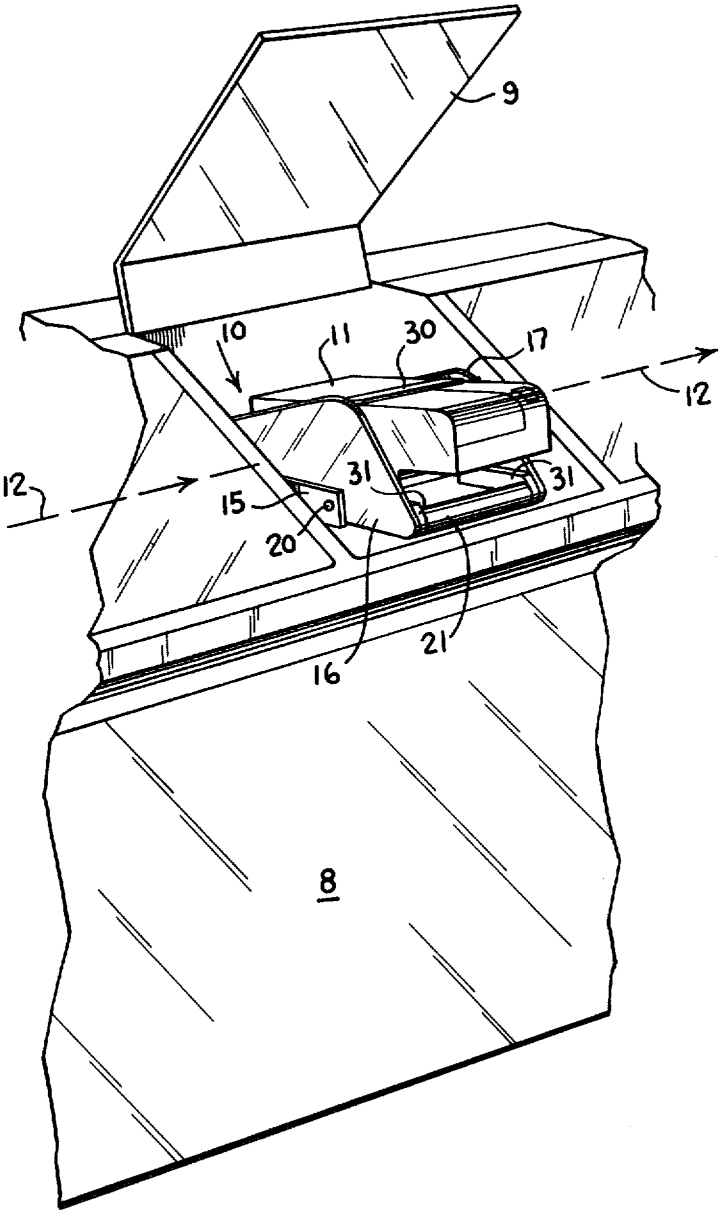
FIG. 1 is a perspective view of the postage meter mounting fixture of this invention shown in situ within a mail-handling machine, and with the postage meter shown in a forward position for easy access thereof.

Now referring to FIG. 1, a mail-handling machine 8 is shown. The cover 9 of the mail-handling machine is in an open position to reveal the postage meter mounting fixture of this invention, as generally shown by arrow 10. The postage meter 11 is illustrated in a forward position with respect to the fixture 10, and the mail-handling machine 8. In this position, the postage meter is disengaged from the machine. Letters normally move along a feed path generally depicted by arrows 12, and when the postage meter 11 is in a rearward engaged position as in FIG. 2, they will be marked with postage. The mounting fixture 10 is cradle-shaped, having two side panels 16 and 17, respectively, which are pivotably mounted to the machine frame extensions 15 (FIG. 2) about the mid-point 20.

In the rearward engaged position (FIG. 2) the meter 11 rests upon the undercarriage 18 of the cradle. Undercarriage 18 provides support for the meter 11. It will also be observed, that the meter printing drum 14 is aligned adjacent feed path 12, when the meter is in this position. Thus, vertically moving letters will be marked with postage from the vertically disposed postage meter 11. The rearward engaged postate meter position is generally not a position in which the meter 11 is easily accessible for purposes of funding the meter or for reading its registers. Therefore, the mounting cradle 10 provides means for disengaging the meter, and for moving the meter to the front of the machine 8, as shown in FIG. 1.

Figure 2:
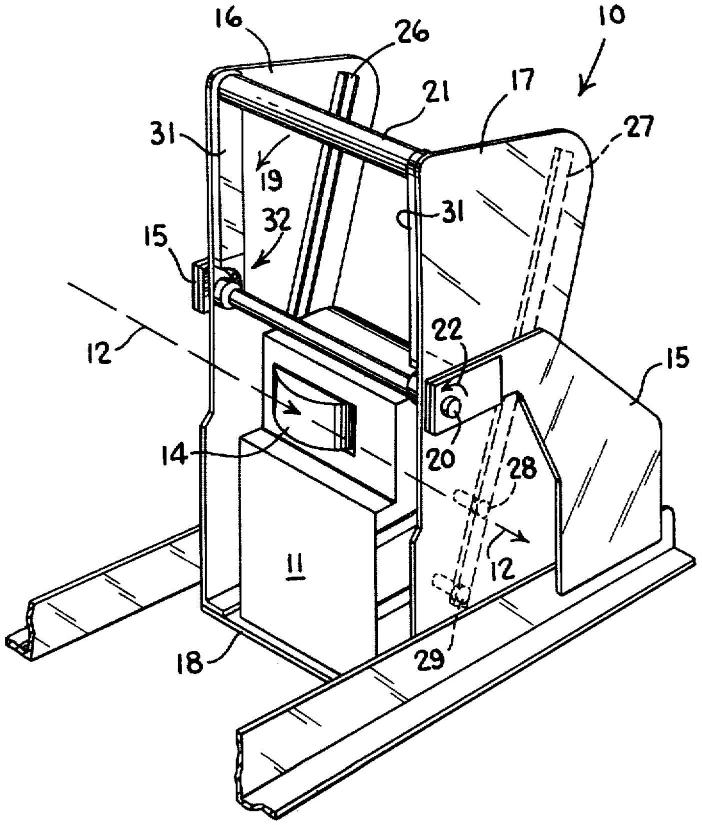
FIG. 2 is a perspective view of the postage meter and mounting fixture of FIG. 1, with the postage meter shown in a postage printing position.

In order to disengage the meter 11, from machine 8, appropriate interlocks 25 are opened (FIG. 3), and handle 21 of the cradle is grasped and pulled forward as depicted by arrow 19. This will cause the meter 11 and the fixture 10 to both pivot about point 20 as illustrated by arrow 22 (FIGS. 2 and 3).

Figure 4:
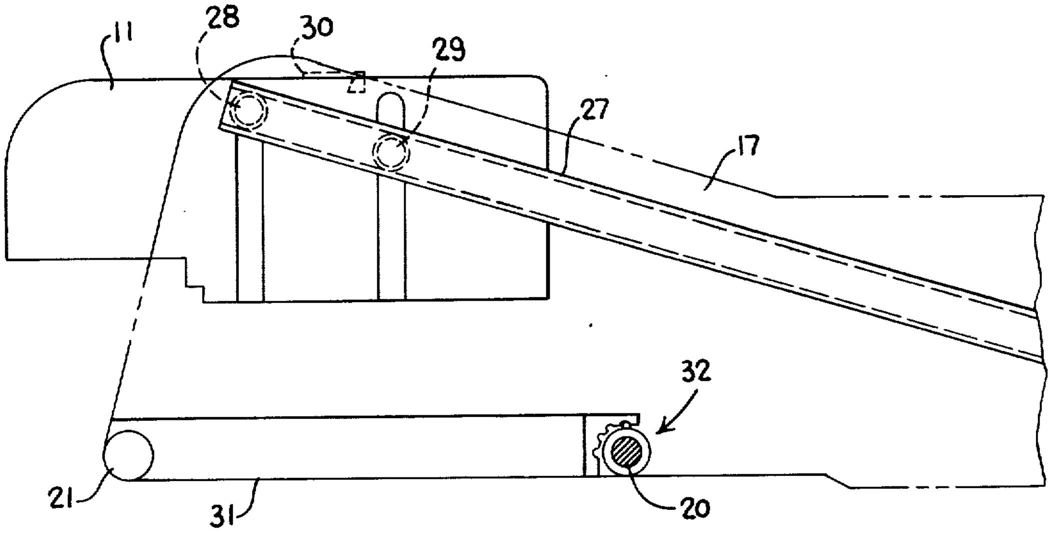
FIG. 4 is a side view of the invention as shown in FIG. 2, with the mounting fixture in the disengaged meter position, and the meter in a forward accessible position as also shown in FIG. 1.
Figure 3:
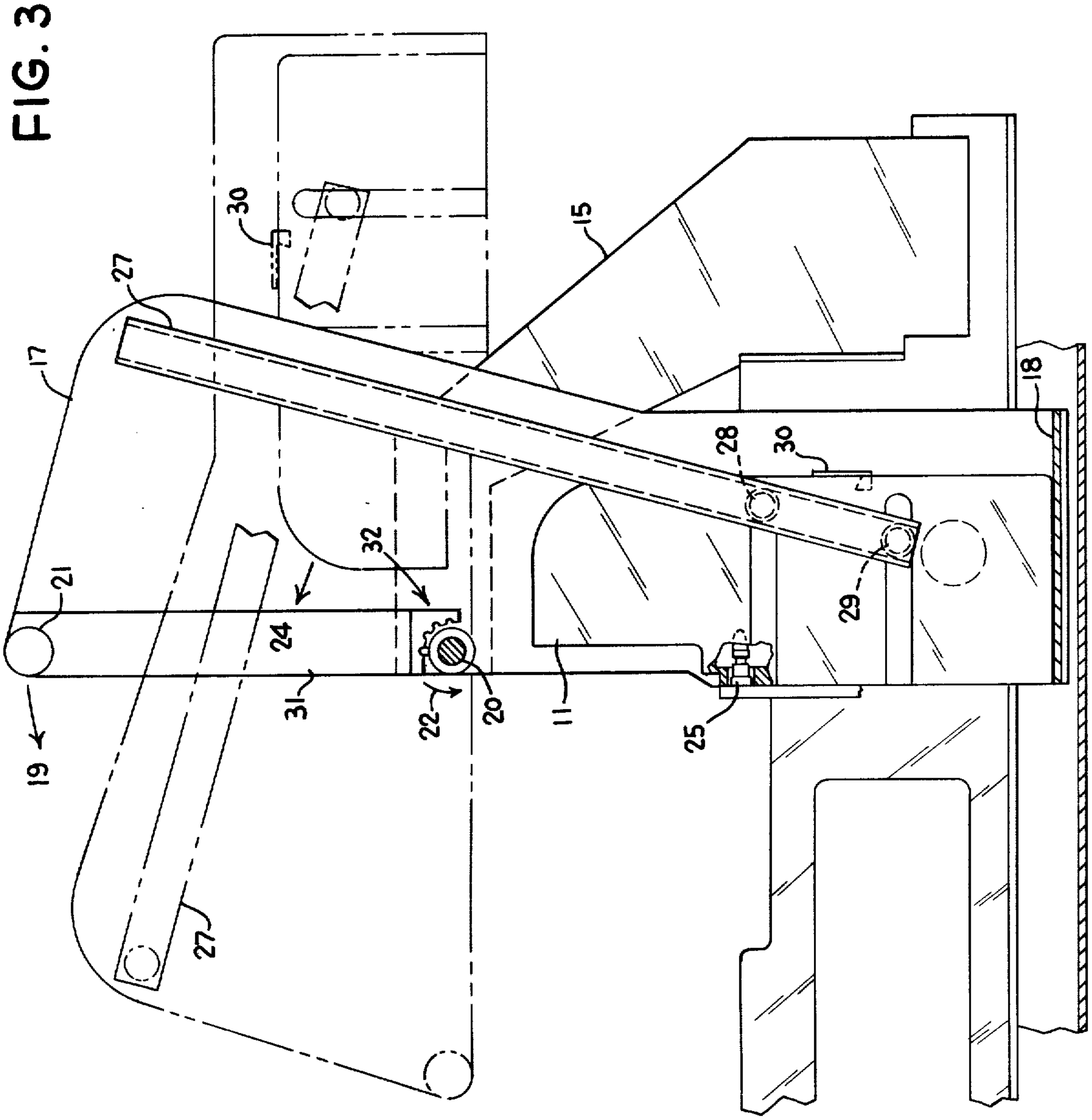
FIG. 3 is a side view of the fixture of the invention of FIG. 2, the solid line view showing the meter in a printing position, and the phantom view showing the meter in a disengaged meter position.

When the cradle is completely pivoted about point 20, it will come to rest in a horizontal position shown in phantom in FIG. 3. The meter 11 is now in a raised horizontal position, and is thoroughly disengaged from the machine. In this disengaged position, the meter 11 is still sitting in a rearward inaccessible position within the machine. Therefore, means are provided to move the meter forward as shown by arrow 24. This is accomplished by means of two tracks 26 and 27, respectively (FIG. 2), which are provided on corresponding side panels 16 and 17. Two wheels 28 and 29, respectively are fixed to meter 11 on each side thereof. These wheels are free to rotate and slide within tracks 26 and 27, respectively, thus allowing for forward movement of the postage meter 11 with respect to the mounting fixture 10 and the machine 8. The forward position of meter 11 is shown in FIGS. 1 and 4. In this position the meter is in a thoroughly accessible position, and can be recharged with funds using a remote meter setting technique as is generally described in U.S. Pat. No. 3,792,466; issued Feb. 12, 1974. A handle 30 (FIG. 3) usually provided on meter 11, makes it convenient to pull the meter forward along tracks 26 and 27 to the accessible position.

Of course, many modifications and changes will be obvious to the skilled practitioner in this art. For example, tracks 26 and 27 can be either internal or external, and correspondingly, wheels 28 and 29 may ride in the tracks or about the tracks, as the case may be.

Good engineering practice will also dictate that the postage meter 11, which is a fairly heavy mass, should be counter-balanced about pivot point 20. To this end weighted strips 31 (FIGS. 1–4) can be added to the side panels 16 and 17 of the cradle. Handle 21 of the cradle may also be weighted to provide a counter-balancing force.

A ratchet or detent device 32 (FIGS. 2–4) can also be provided at the pivot 20 to prevent "back tipping" of the cradle as it is being pivoted in direction 19.

Such changes of an obvious nature are deemed to lie within the scope and spirit of the invention, as presented by the appended claims.

What is claimed is:

1. A postage meter mounting fixture for mounting a postage meter to a mail-handling machine, said postage meter mounting fixture, comprising:

a housing for supporting a postage meter in a first postage printing position such that envelopes moving with a substantially vertical orientation through said mail-handling machine will be marked with postage by said postage meter said housing supporting said postage meter with a vertical orientation in said first position, and including pivot means operatively connected to the housing for pivoting the housing with respect to said mail-handling machine such that said postage meter will assume a second, disengaged position, means defining at least one elongated track extending along a length portion of said housing, and means connected to said postage meter for slidably moving said postage meter along said track when the meter is in said second disengaged position, said postage meter being slidably movable along said track from a first, generally inaccessible position to a second, accessible position.

2. The postage meter mounting fixture of claim 1, wherein said housing is in the form of a cradle-like structure having two side members structurally joined for supporting said postage meter.

3. The postage meter mounting fixture of claim 2, wherein there are two elongated tracks, one track disposed on each of the respective side members, and wherein said postage meter is slidably supported within said tracks.

4. The postage meter mounting fixture of claim 2, wherein the two side members are joined by a meter supporting undercarriage.

5. The postage meter mounting fixture of claim 2, wherein the two side members are joined by a post member which also serves as a handle to aid in pivoting said housing from the first postage printing position to the second disengaged position.

* * * * *

UNITED STATES PATENT OFFICE

CERTIFICATE OF CORRECTION

Patent No. 3,936,114 Dated February 3, 1976

Inventor(s) Anthony Storace and James Morabito

It is certified that error appears in the above-identified patent and that said Letters Patent are hereby corrected as shown below:

Column 3, line 11, Change "3,792,466" to --3,792,446--.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*